(12) United States Patent
Nong et al.

(10) Patent No.: US 12,516,823 B2
(45) Date of Patent: Jan. 6, 2026

(54) TWO-STEP DOOR OPENING COMBINATION

(71) Applicant: WHIRLPOOL CORPORATION, Benton Harbor, MI (US)

(72) Inventors: Shao Ying Nong, Foshan (CN); Tingting Yu, Shenzhen (CN)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 570 days.

(21) Appl. No.: 18/050,109

(22) Filed: Oct. 27, 2022

(65) Prior Publication Data

US 2024/0142111 A1 May 2, 2024

(51) Int. Cl.
*F24C 15/02* (2006.01)

(52) U.S. Cl.
CPC .......... *F24C 15/022* (2013.01); *F24C 15/024* (2013.01)

(58) Field of Classification Search
CPC ...... F24C 15/022; F24C 15/024; F24C 15/02; F24C 7/08; F24C 7/085; H05B 6/6417; H05B 6/6414; E05Y 2900/308; E05Y 2201/426; A47L 15/4259; E05F 15/616; E05C 9/1825; F16B 1/04
USPC .......................... 126/197, 190; 219/722, 739
See application file for complete search history.

(56) References Cited

U.S. PATENT DOCUMENTS

| | | |
|---|---|---|
| 3,943,319 A | 3/1976 | Hirai et al. |
| 4,457,545 A * | 7/1984 | Wilson .................. F24C 15/022 292/29 |
| 9,745,788 B2 * | 8/2017 | Becker ............... G01R 27/2605 |
| 2022/0026074 A1 | 1/2022 | Funk et al. |
| 2023/0296258 A1 * | 9/2023 | Lin .......................... E05C 1/12 126/197 |

FOREIGN PATENT DOCUMENTS

| | | | |
|---|---|---|---|
| CN | 110856299 A * | 2/2020 | .............. A47J 27/04 |
| CN | 111227632 A * | 6/2020 | .............. A47J 27/04 |
| CN | 111397267 A | 7/2020 | |
| CN | 111227632 B | 8/2021 | |
| CN | 110856299 B | 3/2022 | |
| DE | 1959910 U | 5/1967 | |

(Continued)

OTHER PUBLICATIONS

Panasonic NB-G110P at Amazon (online) (available from Jun. 11, 2012). Retrieved on Apr. 24, 2025 from <URL:https://www.amazon.com/dp/B008C9UFDI?th=1> (Year: 2012).*

(Continued)

*Primary Examiner* — Allen R. B. Schult
*Assistant Examiner* — Amy E Carter
(74) *Attorney, Agent, or Firm* — BROOKS KUSHMAN P.C.

(57) ABSTRACT

A two-step pocket handle latch mechanism for an oven is provided. A door is operable between open and closed positions with respect to an open front portion of an oven cavity defined by an oven housing. A pocket handle defines a recess extending into the side of the door opposite a pivotal connection of the door to the oven housing. A latch is controllable by a grip portion within the recess of the pocket handle, between a lower, locked position in which the latch prevents opening of the door, and a raised, unlocked position in which the latch allows the opening of the door.

7 Claims, 4 Drawing Sheets

(56) References Cited

FOREIGN PATENT DOCUMENTS

| | | | |
|---|---|---|---|
| DE | 202014010390 U1 | 8/2015 | |
| EP | 2483502 A1 | 8/2012 | |
| FR | 2294675 A1 | 7/1976 | |
| JP | H9178196 A | 7/1997 | |
| JP | 201242119 A | 3/2012 | |
| WO | 2011039362 A1 | 4/2011 | |
| WO | WO-2018224159 A1 * | 12/2018 | ............ F24C 15/02 |

OTHER PUBLICATIONS

Machine Translation of CN 110856299 (Year: 2020).*
CN 111227632 with Machine Translation (Year: 2020).*

* cited by examiner

TWO-STEP DOOR OPENING COMBINATION

TECHNICAL FIELD

Aspects of the disclosure relate to appliances, and more particularly, to ovens that implement a two-step pocket handle mechanism for access to the oven cavity.

BACKGROUND

Ovens are kitchen appliances that are used to cook food. A door may provide access to the oven cavity when opened. The door may seal the oven cavity for cooking when closed. A door opener mechanism may be provided to allow the user to open the door. In some examples, this mechanism includes a button that, when pressed into the face of the oven, pushes upon an internal mechanism to unlatch and push the door outward towards the user. In other examples, the mechanism includes a side pocket handle that may be used as a grip to pull the door open.

SUMMARY

In one or more embodiments, a two-step pocket handle latch mechanism for an oven is provided. A door is operable between open and closed positions with respect to an open front portion of an oven cavity defined by an oven housing. A pocket handle defines a recess extending into the side of the door opposite a pivotal connection of the door to the oven housing. A latch is controllable by a grip portion provided within the recess of the pocket handle, between a lower, locked position in which the latch prevents opening of the door, and a raised, unlocked position in which the latch allows the opening of the door.

In one or more embodiments, an oven having a two-step door opening mechanism is provided. An oven housing defines an oven cavity having bottom, a top, side walls, and an open front portion. A door is operable between open and closed positions with respect to the open front portion of the oven cavity. The door includes a pocket handle defining a recess extending into the side of the door opposite a pivotal connection of the door to the oven housing, and a latch, controllable by a grip portion within the recess of the pocket handle, between a lower, locked position in which the latch prevents opening of the door, and a raised, unlocked position in which the latch allows the opening of the door.

In one or more embodiments, a method for operation of a two-step pocket handle latch mechanism is provided. The method includes performing a first step to open a door to an oven, the first step including utilizing a latch, controllable by a grip portion within a recess of a pocket handle extending into the side of the door opposite a pivotal connection of the door to an oven housing, to move the latch between a lower, locked position in which the latch prevents opening of the door, and a raised, unlocked position in which the latch allows the opening of the door. The method further includes performing a second step to open the door to the oven, the second step including pulling the door open, using the pocket handle, while the latch is in the raised, unlocked position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Some oven doors may be opened simply by pulling the door open. Such a single step door opener mechanism may be easy for a user to operate. However, such a door may lack child resistance.

Aspects of the disclosure describe a two-step pocket handle latch mechanism for the operation of the oven door. A first step may include raising a latch within the pocket handle from a locked state into an unlocked state. A second step may include pulling the door open. In the locked state, the latch may fit into an opening in the oven housing below the door to prevent the door from opening. In the unlocked state, the latch may be raised to free the door. A latch grip may be hidden inside the pocket handle to avoid affecting the appearance of the oven. Additionally, as the latch grip is located within the pocket handle, the two-step pocket handle latch may be operable using one hand. Thus, ease of actuation is maintained. Moreover, child resistance is accordingly offered by requiring two distinct actions to be performed—raising the latch, and then pulling the door. Further aspects of the disclosure are discussed in detail herein.

Figure 1:
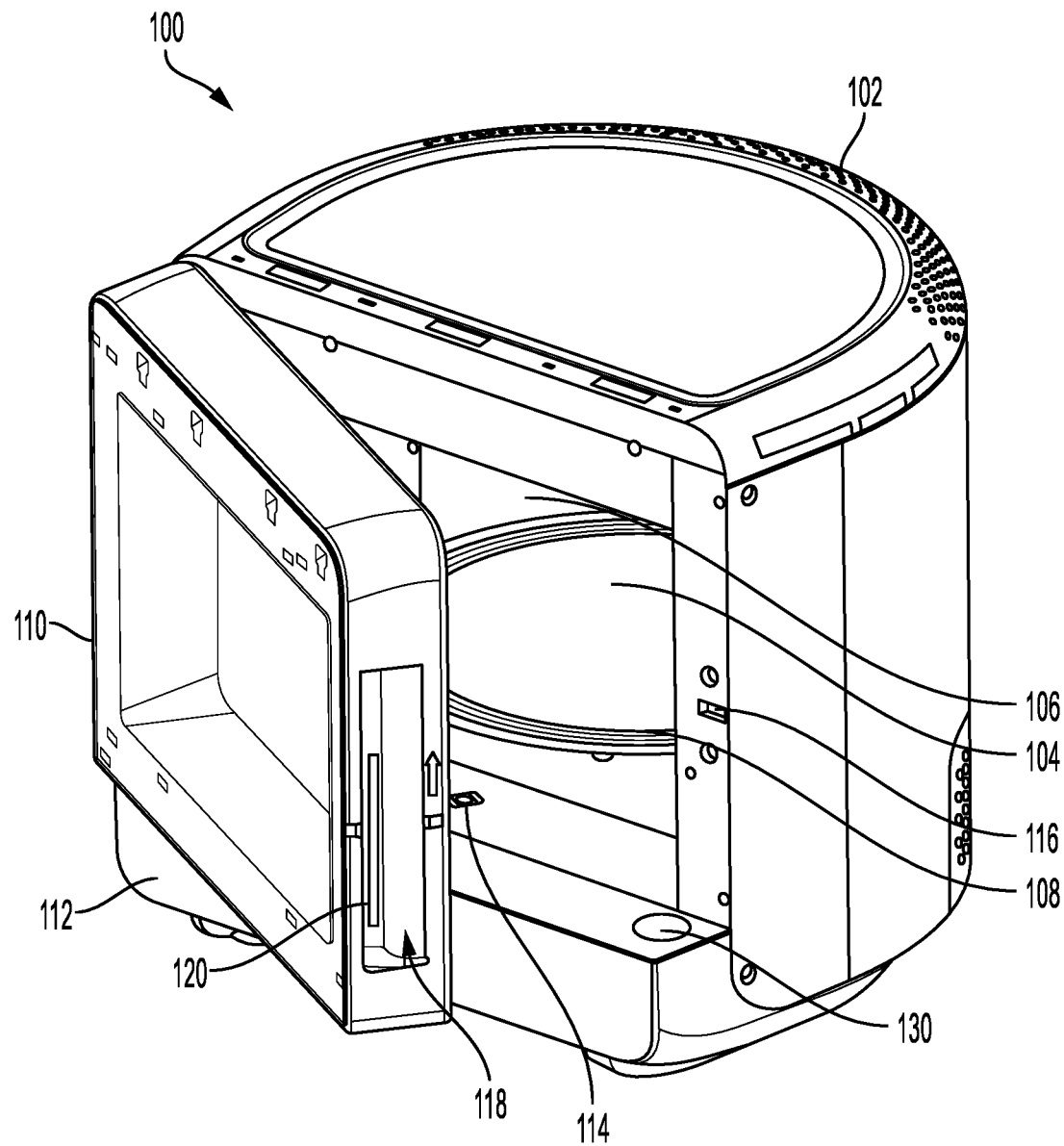
FIG. 1 illustrates a perspective view of an oven having a two-step door latch mechanism.

FIG. 1 illustrates an example front view of an oven 100 having a two-step pocket handle latch mechanism 120. The oven 100 may be of various types, such as a conventional oven, a microwave oven, or a combination microwave oven. While the oven 100 is shown as standalone, it should be noted that the two-step pocket handle latch mechanism 120 may be utilized in other types of oven 100, such as a built-in oven, or a range having an oven portion. Moreover, the two-step pocket handle latch mechanism 120 may be incorporated into other types of appliances having locking doors, such as refrigerators or a front loading washers or dryers.

The oven 100 includes a housing 102 that defines an oven cavity 104. The oven cavity 104 generally includes a bottom, a top, side walls, and an open front portion 106. As shown, the cavity is relatively cylindrical in shape with a flat top and bottom, but in other examples, the oven cavity 104 may form a rectangular prism shape. In some examples, the oven cavity 104 may include a turntable 108 or other apparatus to allow for rotation of food items during a cooking cycle of the oven 100.

The oven 100 also includes a door 110 to the oven cavity 104. The door 110 is generally operable between open and closed positions with respect to the open front portion 106 of the oven cavity 104. In the open position, the user has access to the oven cavity 104 via the open front portion 106, while in the closed position the door 110 seals the oven cavity 104 to allow for cooking to be performed. The door 110 may operate as a side swing closure, pivotally coupled to the oven 100 on a vertical axis for rotational movement between the open and closed positions. Thus, the door 110 selectively provides access to the oven cavity 104. As illustrated in FIG. 1, the door 110 is shown in a partially open position.

A control panel 112 may also be provided on the front face of the oven 100, below the door 110. The control panel 112 area of the housing 102 may extend forwards from the open front portion 106 of the oven cavity 104 and may be the approximate thickness of the door 110, such that when the door 110 is closed, the front of the control panel 112 may be flush with the front of the door 110. The control panel 112 may include controls that, when operated by a user, allow for the user to select one or more modes of operation for the oven 100. The control panel 112 may include a knob, button, or other control for controlling the operation of the oven 100. The control panel 112 may accordingly allow a user to select different levels of cooking. The control panel 112 may also include one or more lights, screens or other display elements to provide information to the user about the operation of the oven 100.

The door 110 may include a latch mechanism to secure lock the door 110 in the closed position. For instance, the door 110 may define a fastener 114 that fits into a slot 116 in the front face of the housing 102 when the door 110 is rotated into the closed position. When the door is closed, the fastener 114 may snaps over a protrusion, hook, or other mechanism (not shown) to hold the door 110 in the closed position.

To facilitate door operation, the door 110 may define a pocket handle 118 on the opposite side of the door 110 from the hinged connection to the housing 102. As shown, the hinge is on the left side of the door 110 and the pocket handle 118 is on the right side of the door 110, but this may be reversed in other designs. The pocket handle 118 may define a recess extending vertically into the side of the door 110. Using the pocket handle 118, a user can insert their fingers into the recess and pull against the front of the recess, overcoming the hold of the fastener 114 and rotating the door to provide access to the oven cavity 104. The user may close the door by pushing the door 110 inwards, thereby causing the door to rotate back into the closed position.

Such an oven door 110 may be easily opened with only one step, i.e., pulling the door 110 open using the pocket handle 118. However, such a door 110 may also be easily opened by a child. This may be undesirable if the child should not have access to hot food items the oven cavity 104. As explained in detail herein, a two-step pocket handle latch mechanism 120 may be used to allow for securing of the oven door 110. A first step may include raising a latch 122 within the pocket handle 118 from a locked state into an unlocked state. A second step may include pulling the door 110 open using the pocket handle 118 once the latch 122 is raised.

The latch 122 may define a grip portion 124, illustrated herein at an upper end of the latch 122. The grip portion 124 may facilitate operation of the latch 122 by giving the user a convenient handle to grip onto and raise the latch 122 as desired. The latch 122 may further define a locking post 126 provided within the interior of the door 110, such that the locking post 126 is nested between front and back panels of the door 110. The locking post 126 may further define a locking pin 128 protruding downward from a lower end of the locking post 126. The locking post 126 may be movable within and relative to the door 110, such that the locking post 126 is vertically slidable within and relative to the door 110 between a lower, locked position and a raised, unlocked position.

The locking pin 128 may be configured to engage with a receptacle 130 defined by the control panel 112 portion of the housing 102 below the door 110. The receptacle 130 may be sized and located in a position to allow the locking pin 128 to pass downward into the control panel 112 area when the door 110 is in the closed position.

Figure 2:
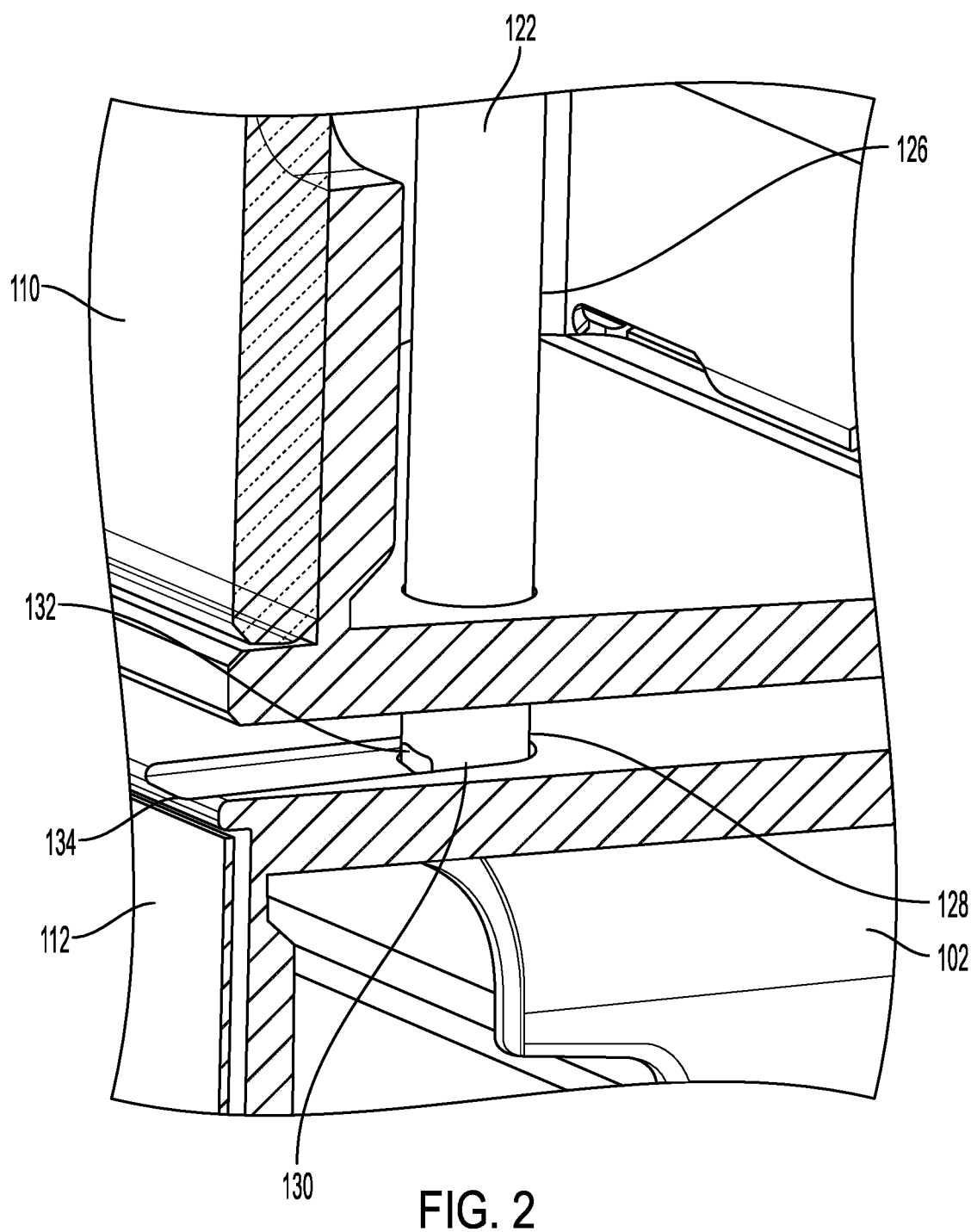
FIG. 2 illustrates a perspective cutaway view of the two-step door latch mechanism in the locked state.
Figure 3:
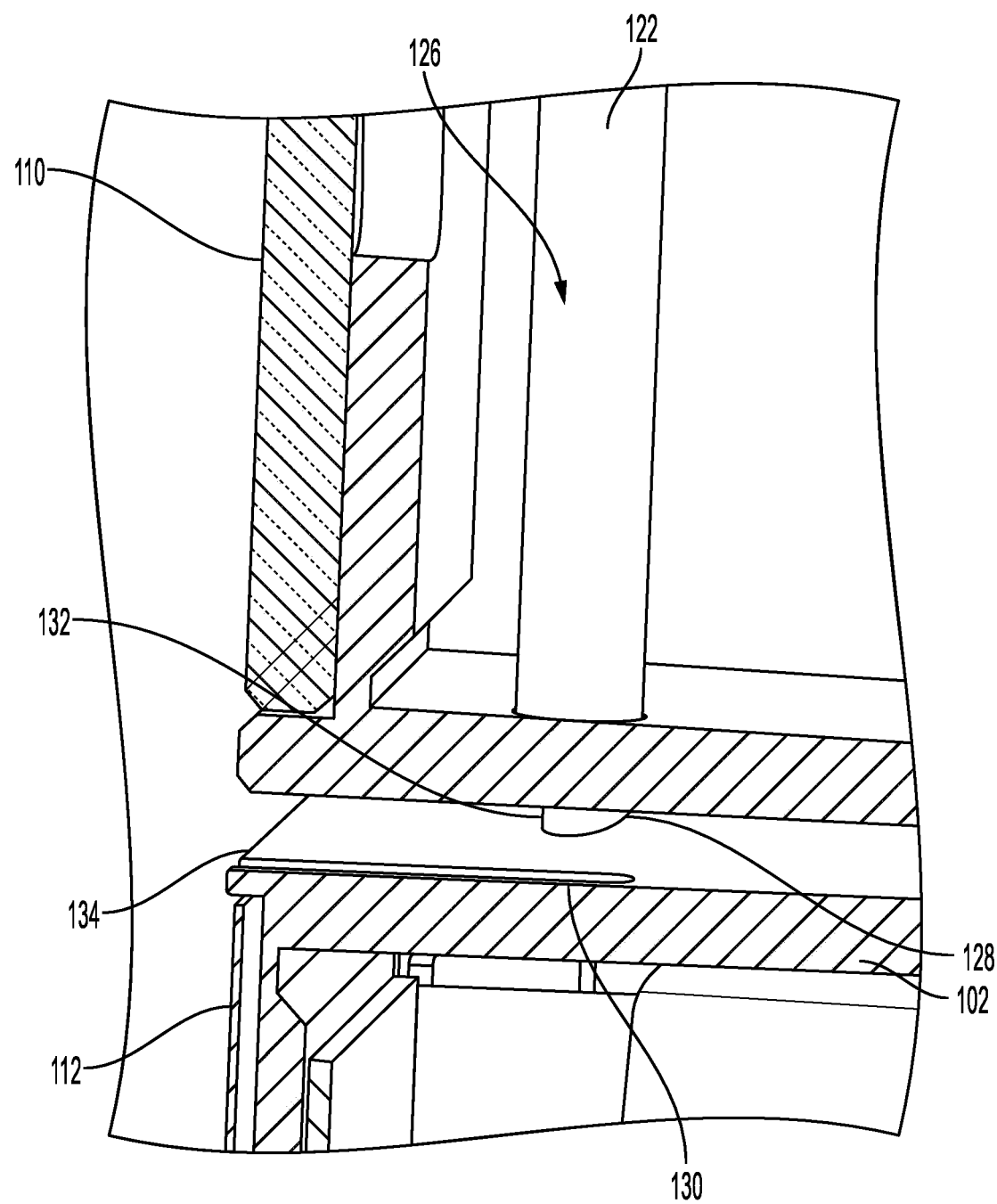
FIG. 3 illustrates a perspective cutaway view of the two-step door latch mechanism in the unlocked state.

FIG. 2 illustrates a perspective cutaway view of the two-step door latch mechanism in the lower, locked state. FIG. 3 illustrates a perspective cutaway view of the two-step door latch mechanism in the raised, unlocked state. Referring collectively to FIGS. 2-3, the locking pin 128 may define a generally tubular vertical shaft with a rounded lower end, the lower end further defining a flat face 132 for engaging a corresponding flat front of the pin receptacle 130.

Figure 4:
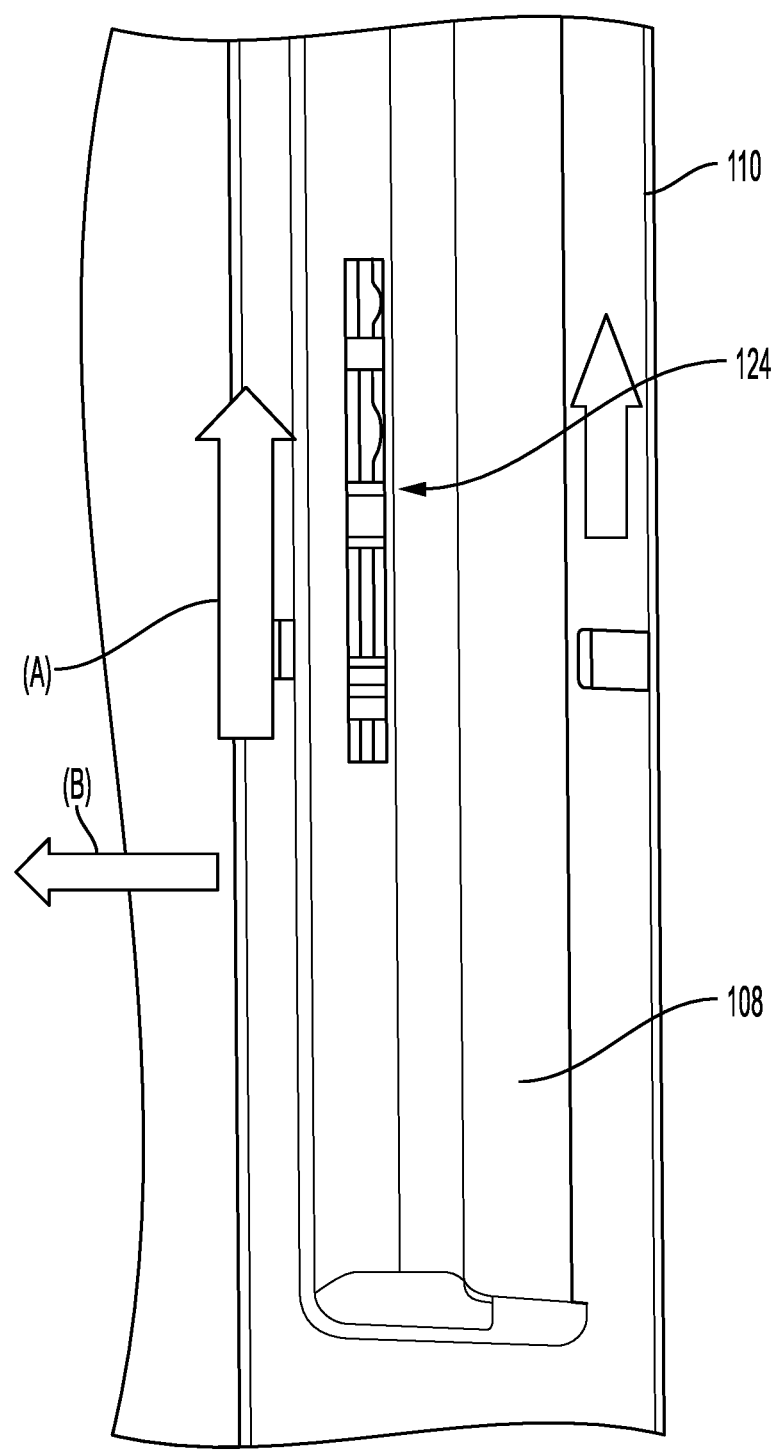
FIG. 4 illustrates a side view closeup of the pocket handle and latch of the two-step door latch mechanism.

Referring more specifically to FIG. 4, a side view closeup of the pocket handle 118 and grip portion 124 of the latch 122 is illustrated. As shown, the grip portion 124 that is exposed to a user's hand within the recess of the pocket handle 118 is hidden inside the pocket handle 118. Advantageously, this may avoid affecting the outer look or aesthetics of the door 110. In an example, the grip portion 124 may define one or more indentations or grooves on its outer face to facilitate gripping by a user's fingers. These indentations may allow a user to better make contact with the latch 122.

To enter the locked state, the latch 122 may slide downwards into the receptacle 130. When the door 110 is closed and the locking pin 128 is lowered, the flat face 132 of the locking pin 128 may provide a surface to engage against the corresponding flat face of the receptacle 130. This action may accordingly resist against outward movement of the door 110, thereby preventing the door 110 from being opened when the latch 122 is in the lowered, locked position. Although not shown, a biasing element may be used to bias the locking post 126 downwardly when not raised by the user. In other examples, gravity may provide sufficient force to allow the latch 122 to default into the lowered, locked position.

The control panel 112 portion of the housing 102 may further define a pin channel 134 extending across the top face of the control panel 112 from the receptacle 130 forward to the front of the housing 102. The pin channel 134 may define a recess contoured to correspond to the rounded lower end of the locking pin 128. When the door 110 of the oven 100 pushed to close the door 110, the locking pin 128 may be in the lowered position. As the lower end of the locking pin 128 is forced against the pin channel 134, the pin channel 134 may serve to guide the locking pin 128 upwards. As the pin channel 134 urges the locking pin 128 upwards as the door 110 is moved inwards, the door 110 is not blocked from closing by the locking pin 128 coming into contact with the front of the control panel 112. Once the door 110 is fully closed, the locking pin 128 may reach and drop into the receptacle 130, thereby locking the door 110.

To open the door 110, a two-step process may be performed. As shown by operation (A), the first step may include the user grabbing and raising the grip portion 124 of the latch 122 within the pocket handle 118. This may accordingly move the locking post 126 upwards, in turn lifting the locking pin 128 out of the receptacle 130 and into the raised, unlocked state. As shown by operation (B), while the first step is being performed, the second step may involve the user pulling the door 110. As the grip portion 124 is located within the pocket handle 118, this two-step process may be operable using one hand. Thus, ease of actuation is maintained. Moreover, child resistance is accordingly offered by the two distinct actions of the two-step mechanism.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An oven having a two-step door opening mechanism, comprising:
    an oven housing defining an oven cavity having bottom, top, and side walls, and an open front portion; and
    a door, operable between open and closed positions with respect to the open front portion of the oven cavity, the door including
        a pocket handle defining a recess extending into the side of the door opposite a pivotal connection of the door to the oven housing, and
        a latch, controllable by a grip portion within the recess of the pocket handle, between a lower, locked position in which the latch prevents opening of the door, and a raised, unlocked position in which the latch allows the opening of the door, wherein the latch includes a locking post provided within the interior of the door, the locking post being nested between front and back panels of the door, and a locking pin protruding downwardly from a lower end of the locking post, the locking post being movable within and relative to the door, such that the locking post is vertically slidable within and relative to the door between the lower, locked position and the raised, unlocked position,
    wherein the oven housing further comprises a control panel area on the front face of the oven below the door, the control panel area extending forwards from the open front portion of the oven cavity,
    wherein the control panel area defines a pin receptacle sized and located to allow the locking pin to pass downward into the control panel area when the door is in the closed position.

2. The oven of claim 1, wherein the front of the control panel area is flush with the front of the door when the door is in the closed position.

3. The oven of claim 1, wherein the control panel area defines a pin channel extending across the top face of the control panel area from the pin receptacle forward to the front of the oven housing, the pin channel being contoured to correspond to a rounded end of the locking pin, the pin channel being configured to guide the locking pin upwards when the door is closed while the locking pin is in the lower, locked position.

4. The oven of claim 1, wherein a lower end of the locking pin defines a flat front face for engaging a corresponding flat front of the pin receptacle when in the lower, locked position, the flat front face providing a surface to engage against the pin receptacle and resist against outward movement of the door.

5. The oven of claim 1, wherein the grip portion defines one or more indentations or grooves on its outer face sized to facilitate gripping by a user's fingers.

6. A method for operation of a two-step pocket handle latch mechanism, comprising:
    performing a first step to open a door to an oven, the first step including utilizing a latch, controllable by a grip portion within a recess of a pocket handle extending into the side of the door opposite a pivotal connection of the door to an oven housing, to move the latch between a lower, locked position in which the latch prevents opening of the door, and a raised, unlocked position in which the latch allows the opening of the door, wherein the latch includes a locking post provided within the interior of the door, the locking post being nested between front and back panels of the door, and a locking pin protruding downwardly from a lower end of the locking post, the locking post being movable within and relative to the door, such that the locking post is vertically slidable within and relative to the door between the lower, locked position and the raised, unlocked position, wherein the oven housing further comprises a control panel area on the front face of the oven below the door, the control panel area extending forwards from the open front portion of the oven cavity, and wherein the control panel area defines a pin receptacle sized and located to allow the locking pin to pass downward into the control panel area when the door is in the closed position; and
    performing a second step to open the door to the oven, the second step including pulling the door open, using the pocket handle, while the latch is in the raised, unlocked position.

7. The method of claim 6, wherein raising the latch and pulling the door open are performed using a single hand.

\* \* \* \* \*